United States Patent
Shah et al.

(10) Patent No.: US 9,811,181 B2
(45) Date of Patent: Nov. 7, 2017

(54) NOISE CORRECTION FOR A STYLUS TOUCH DEVICE

(71) Applicant: Apple Inc., Cupertino, CA (US)

(72) Inventors: Apexit Shah, Cupertino, CA (US); Seyed M. Navidpour, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/052,435

(22) Filed: Feb. 24, 2016

(65) Prior Publication Data

US 2017/0242499 A1  Aug. 24, 2017

(51) Int. Cl.
*G06F 3/0354* (2013.01)

(52) U.S. Cl.
CPC .................. *G06F 3/03545* (2013.01)

(58) Field of Classification Search
CPC .... G06F 3/0418; G06F 3/044; G06F 3/03545; G06F 3/0412
See application file for complete search history.

(56) References Cited

U.S. PATENT DOCUMENTS

| 2014/0071082 A1* | 3/2014 | Singh ............... G06F 3/044 345/174 |
| 2016/0147319 A1* | 5/2016 | Agarwal ............ G06F 3/0418 345/173 |

* cited by examiner

*Primary Examiner* — Abbas Abdulselam
(74) *Attorney, Agent, or Firm* — DLA Piper, LLP (US)

(57) ABSTRACT

In one aspect, the present disclosure relates to a method and system for performing a noise correction technique including determining core electrodes and non-core electrodes, generating a noise estimate for each electrode based on electrodes that are at least an offset distance away from the electrode, correcting the signal at each electrode based on the noise estimate, and setting the corrected signal to zero if the corrected signal has a sign that is opposite the sign of the peak magnitude signal. By performing this method, noise induced on sense lines of a stylus by an LCD can be corrected for and accuracy of stylus positioning may be improved.

20 Claims, 9 Drawing Sheets

NOISE CORRECTION FOR A STYLUS TOUCH DEVICE

FIELD

The present disclosure relates generally to touch screen devices compatible with active styluses.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device.

In general, touch screens can recognize a touch event and the position of the touch event on the touch sensor panel, and the computing system can then interpret the touch event in accordance with the display appearing at the time of the touch event, and thereafter can perform one or more actions based on the touch event. More advanced touch screens are capable of detecting multiple touches simultaneously. In general, touch screens can recognize the position of the one or more touches on the touch sensor panel, and a computing system can then interpret the touches, either individually or as a single gesture in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. Touch sensor panels may generally be configured to detect touches from a user's fingers, which generally have a surface area that contacts the touch sensor panel to disturb the stimulation signal sufficiently for touch location to be recognized.

When a stylus has been used as an input device in a capacitive touch system, the stylus has traditionally been finger-like in nature. A conventional stylus is often simply a conductive rod with a finger-sized rounded tip large enough to disrupt the electric field lines between the drive and sense electrodes of a capacitive touch sensor panel. As such, conventional styluses are passive input devices in that they are incapable of actively transmitting stimulus signals or sensing a touch-induced capacitance change in a capacitive touch sensor panel.

Another type of stylus, the active stylus disclosed in U.S. Pat. No. 8,928,635, incorporated herein in its entirety, acts as a drive and/or a sense element in a capacitive touch system. Unlike conventional styluses which work passively by blocking electric field lines between the drive and sense electrodes of a capacitive touch sensor panel, active styluses can either act as a drive electrode to create an electric field between the drive electrode and the sense lines of a mutual capacitive touch sensor panel, or as a sense electrode for sensing capacitively coupled signals from one or more stimulated drive rows and columns of the touch sensor panel or both. These styluses can be referred to as active styluses in comparison to conventional passive styluses. These active styluses can significantly improve stylus sensing on a mutual capacitive touch sensor panel without incurring significant additional cost.

SUMMARY

Embodiments of the present disclosure include an active stylus LCD device that mitigates noise induced by one or more electrical components of the display, and a method for mitigating LCD circuitry noise in an active stylus touch device. The present disclosure may thus enable a more accurate and precise detection of stylus position.

In an embodiment of the present disclosure, LCD circuitry noise may be mitigated by storing a sign of a peak magnitude signal of a plurality of signals measured at a plurality of electrodes, and determining a set of core electrodes of the plurality of electrodes and a set of non-core electrodes of the plurality of electrodes. In this embodiment, mitigation also includes determining, for each core electrode of the plurality of electrodes, a noise estimate for the core electrode based on a corresponding core electrode mitigation set determined by the position of the core electrode, and determining, for each non-core electrode of the plurality of electrodes, a noise estimate based on a corresponding non-core electrode mitigation set determined by the position of the non-core electrode. Mitigation also includes determining a plurality of corrected signals, wherein for each core electrode and each non-core electrode a corresponding corrected signal of the plurality of corrected signals is determined based on the noise estimate and the signal measured at the electrode. Finally, for each of the plurality of corrected signals, the corrected signal is set to zero if the sign of the corrected signal is not the same as the stored peak magnitude signal sign; and a position of an active stylus is determined based on the plurality of corrected signals.

In some embodiments of the present disclosure, each corrected signal is determined by subtracting the noise estimate for an electrode from the signal measured at the corresponding electrode.

In some embodiments of the present disclosure, mitigating noise further includes weighting the noise estimate for each non-core electrode based on a default weight, the position of the corresponding non-core electrode with respect to the edge of the device, and the total number of electrodes being processed. In further embodiments, the noise estimate is reduced in weight as the corresponding non-core electrode position is closer to the edge of the device.

In some embodiments of the present disclosure, the core electrode mitigation set comprises electrodes at least a pre-determined offset number of electrodes away from the corresponding core electrode. In some embodiments, the core electrode mitigation set comprises a first pre-determined number of electrodes in each direction from the core electrode at least a pre-determined offset number of electrodes away from the corresponding core electrode.

In some embodiments of the present disclosure, the non-core electrode mitigation set comprises electrodes at least a pre-determined offset number of electrodes away from the corresponding non-core electrode in the direction of the center of the device. In further embodiments of this disclosure, the core electrode mitigation set comprises electrodes at least a pre-determined offset number of electrodes away from the corresponding core electrode, the core electrode mitigation set comprises a first pre-determined number of electrodes in each direction from the corresponding core electrode, and the non-core electrode mitigation set comprises a second pre-determined number of electrodes in the direction of the center of the device that is twice the first pre-determined number of electrodes.

In some embodiments of the present disclosure, the plurality of measured signals are split into a plurality of I domain signals and a plurality of Q domain signals and the plurality of I domain signals and the plurality of Q domain signals are processed independently. In some embodiments, processing is performed on one of a row sense line or a column sense line. In other embodiments, processing is performed on a two-dimensional grid of signals.

In another embodiment of the present disclosure, there is disclosed an active stylus LCD device including a display, a plurality of electrodes which experience noise induced by one or more electrical components of the display, a memory storing program instructions, and a processor coupled to the memory. The processor is configured to execute the program instructions, and the program instructions cause the processor to store a sign of a peak magnitude signal of a plurality of signals measured at the plurality of electrodes, determine a set of core electrodes of the plurality of electrodes and a set of non-core electrodes of the plurality of electrodes, determine, for each core electrode of the plurality of electrodes, a noise estimate for the core electrode based on a corresponding core electrode mitigation set determined by the position of the core electrode, determine, for each non-core electrode of the plurality of electrodes, a noise estimate based on a corresponding non-core electrode mitigation set determined by the position of the non-core electrode, determine a plurality of corrected signals, wherein for each core electrode and each non-core electrode a corresponding corrected signal of the plurality of corrected signals is determined based on the noise estimate and the signal measured at the electrode, and for each of the plurality of corrected signals, set the corrected signal to zero if the sign of the corrected signal is not the same as the stored peak magnitude signal sign. Finally, the program instructions determine a position of an active stylus based on the plurality of corrected signals.

In some embodiments of the present disclosure, each corrected signal is determined by subtracting the noise estimate for an electrode from the signal measured at the corresponding electrode. In some embodiments, the processor executes further program instructions to weight the noise estimate for each non-core electrode based on a default weight, the position of the corresponding non-core electrode with respect to the edge of the device, and the total number of electrodes being processed. In some embodiments, the noise estimate is reduced in weight as the corresponding non-core electrode position is closer to the edge of the device.

In some embodiments of the present disclosure, the core electrode mitigation set comprises electrodes at least a pre-determined offset number of electrodes away from the corresponding core electrode. In some embodiments, the core electrode mitigation set comprises a first pre-determined number of electrodes in each direction from the core electrode at least a pre-determined offset number of electrodes away from the corresponding core electrode.

In some embodiments of the present disclosure, the non-core electrode mitigation set comprises electrodes at least a pre-determined offset number of electrodes away from the corresponding non-core electrode in the direction of the center of the device. In further embodiments, the core electrode mitigation set comprises electrodes at least a pre-determined offset number of electrodes away from the corresponding core electrode, and a first pre-determined number of electrodes in each direction from the corresponding core electrode, and the non-core electrode mitigation set comprises a second pre-determined number of electrodes in the direction of the center of the device that is twice the first pre-determined number of electrodes.

In some embodiments of the present disclosure, the plurality of measured signals are split into a plurality of I domain signals and a plurality of Q domain signals and the plurality of I domain signals and the plurality of Q domain signals are processed independently.

Other features and advantages will become apparent from the following detailed description and drawings.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DESCRIPTION

Figure 1:
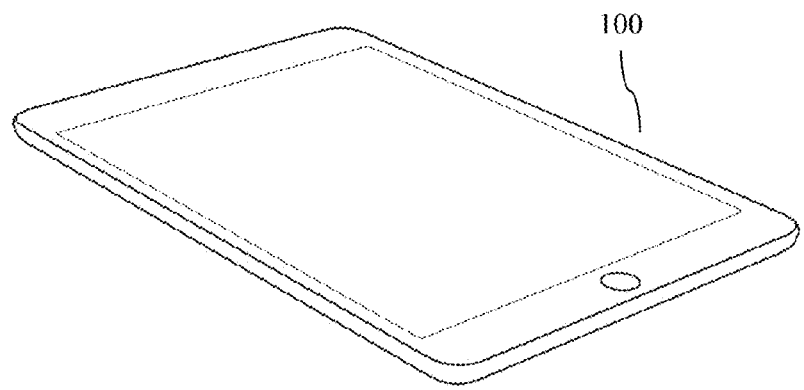
FIG. 1 shows a touch screen device in accordance with an embodiment of the present disclosure.

In general, in a device that uses an LCD screen and supports an active stylus, the LCD and touch/stylus sensors are very close to each other. The LCD screen generates electrical noise (for example, switching noise from the transistors that drive the liquid crystal turning on and off.) This electrical noise may couple from the LCD screen into the touch/stylus sensors. The noise generated and coupled into the sensors in this way is a function of the design of the LCD and the design of the touch/stylus sensors, as well as the image being displayed by the LCD at any given point in time. The noise is typically common mode noise and has a characteristic shape. In some instances, this characteristic shape is a bow or ovoid shape.

In common touch devices, touch sensing is performed while the LCD is in a state (e.g., during a blanking interval) that generates low amounts of noise in order to mitigate this problem. For example, as described in U.S. Pat. No. 8,890,854, incorporated herein in its entirety, touch displays can synchronize scanning of the touch sensor and LCD refresh so that the touch sensor is scanned when the LCD is not being refreshed (the "LCM blanking interval"), by which technique noise generated by the LCD display is minimized during touch scanning. However, active stylus systems may detect stylus position during other phases of the LCD (e.g., outside of the LCM blanking interval). When the noise couples into the stylus sense lines, it directly affects the stylus sense lines, resulting in errors in the determined stylus position. Because the noise is time-varying, the resulting error effectively reduces the accuracy of positioning.

The present disclosure describes a touch-screen device that mitigates coupling of noise between an LCD display and stylus sense lines of the touch-screen device.

In the present disclosure, a method and system is described in which certain electrodes are determined to be core electrodes (i.e., electrodes that are not on the edge of the device). For each core electrode, a noise estimate is generated based on the N closest electrodes on each side of the core electrode that are at least a minimum offset distance $D_{off}$ away. For each non-core electrode, a noise estimate is generated based on the M closest electrodes, taken from the side with more electrodes (i.e., towards the center of the device from the edge) that are at least a minimum offset distance $D_{off}$ away. N and M are values that may be selected based on the noise characteristics of a given device. In some embodiments of the present disclosure, M is twice N. In one embodiment of the present disclosure, N is set to 2 and M set to 4. Then, for each electrode, a corrected electrode value is determined by subtracting the noise estimate from the measured electrode value. If the corrected value is not the same sign as the sign of a peak magnitude signal, the corrected value is set to zero; otherwise, the corrected value is used. In some embodiments of the present disclosure, the electrode signal is converted to the I/Q domain and the I and Q signals are separately processed using the method of the present disclosure.

By such noise mitigation processing, the LCD-induced noise can be reduced in magnitude, and can additionally have the magnitude of the noise made more similar no matter how far from the edge of the display an electrode is such that error in determined position is approximately the same across the entire device, rather than being increased in the center of the display.

FIG. 1 shows an example of a touch screen device 100, such as a smartphone or tablet, as described in more detail herein. The touch screen device 100 may include one or more touch sensors, including a plurality of sense rows and columns for sensing touch contacts and/or stylus contacts.

Figure 2:
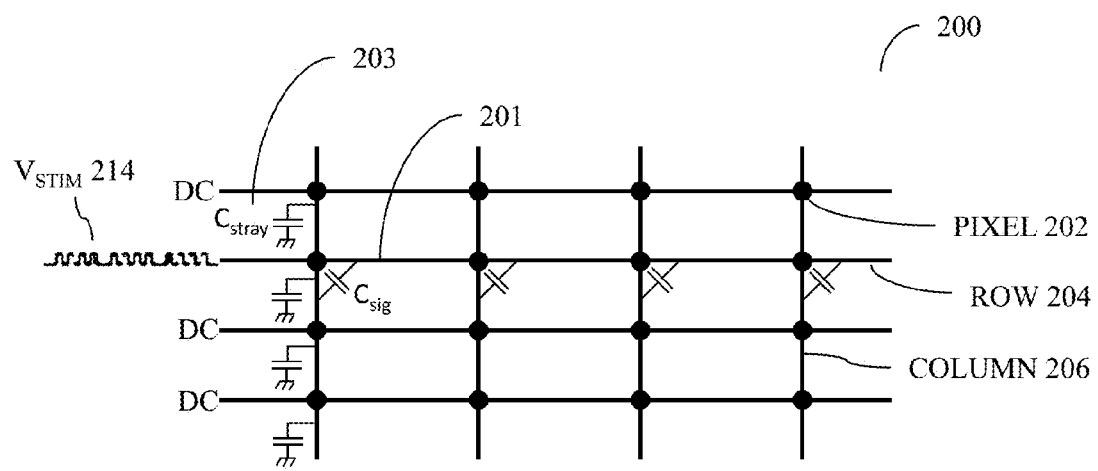
FIG. 2 shows the underlying structure of an exemplary capacitive touch sensor panel.

FIG. 2 shows the underlying structure of an exemplary capacitive touch sensor panel 200. Capacitive touch sensor panels are well known in the art and have been widely adopted in various types of electronic devices, such as tablet PCs (e.g., the iPad® from Apple Inc. of Cupertino, Calif.) and smartphones (e.g., the iPhone® from Apple Inc. of Cupertino, Calif.). One exemplary type of capacitive touch sensor panel include a mutual capacitive touch sensor panel formed from drive and sense lines (e.g., rows and columns of traces) on opposite sides of a dielectric, or adjacent to each other on the same side of a substrate. At the "intersections" of the traces, where the traces pass above and below or are adjacent to each other (but do not make direct electrical contact with each other), the traces essentially form two electrodes. In one embodiment, touch sensor panels for use over display devices may utilize a top layer of glass upon which transparent column traces of indium tin oxide (ITO) or antimony tin oxide (ATO) have been etched, and a bottom layer of glass upon which row traces of ITO have been etched. The top and bottom glass layers can be separated by a clear polymer spacer that acts as a dielectric between the row and column traces. Other touch sensor panel configurations, such as those with drive and sense lines on opposite sides of a substrate or on the same side of a substrate, and self-capacitance touch sensor panels are also contemplated for use with embodiments of the disclosure.

FIG. 2 indicates the presence of a mutual capacitance Csig 201 at each pixel 202 located at the intersection of a row 204 and a column 206 trace (although Csig for only one column is illustrated in FIG. 2 for purposes of simplifying the figure). FIG. 2 also indicates the presence of a stray capacitance Cstray 203 at each pixel 202 located at the intersection of a row 204 and a column 206 trace (although Cstray for only one column is illustrated in FIG. 2 for purposes of simplifying the figure). Note that although FIG. 2 illustrates rows 204 and columns 206 as being substantially perpendicular, they need not be so aligned. In the example of FIG. 2, AC stimulus Vstim 214 is being applied to one row, for example by an active stylus or by touch sensor circuitry, with all other rows connected to DC. The stimulus causes a charge to be injected into the column electrodes through mutual capacitance at the intersection points. Each of columns 206 may be selectively connectable to one or more analog channels.

Figure 3:
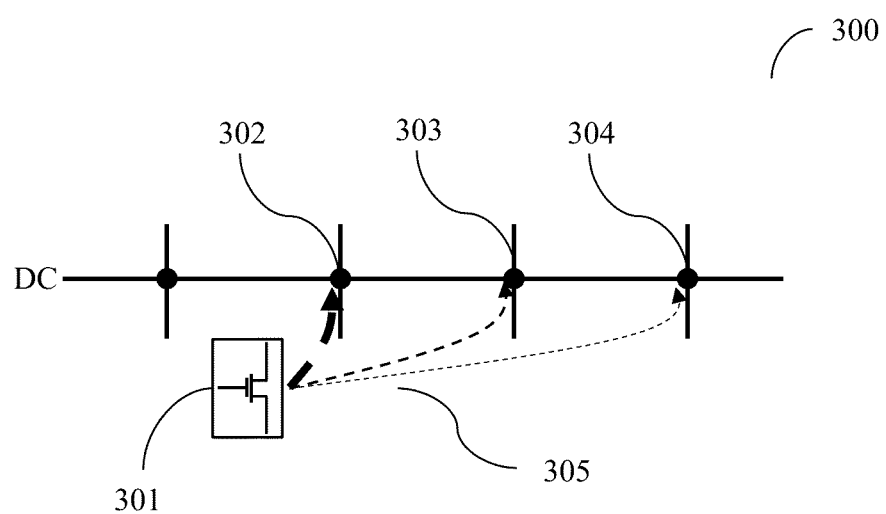
FIG. 3 shows the coupling of LCD noise into the stylus sense line.

FIG. 3 shows the coupling of LCD noise into the stylus sense line. LCD circuit element 301 (e.g., a transistor) is located near the pixel 302 (which, as shown in FIG. 2, is the intersection of a row and column trace, not labeled in this figure) and also near pixels 303 and 304. Electrical noise 305, generated by LCD circuit element 301, couples to the pixels 302, 303, and 304, with the strength of the coupled noise affected by distance between the LCD circuit element and the pixels. The coupled noise affects pixels 302, 303, and 304, and shows up on their corresponding sense lines and electrodes.

Figure 4A:
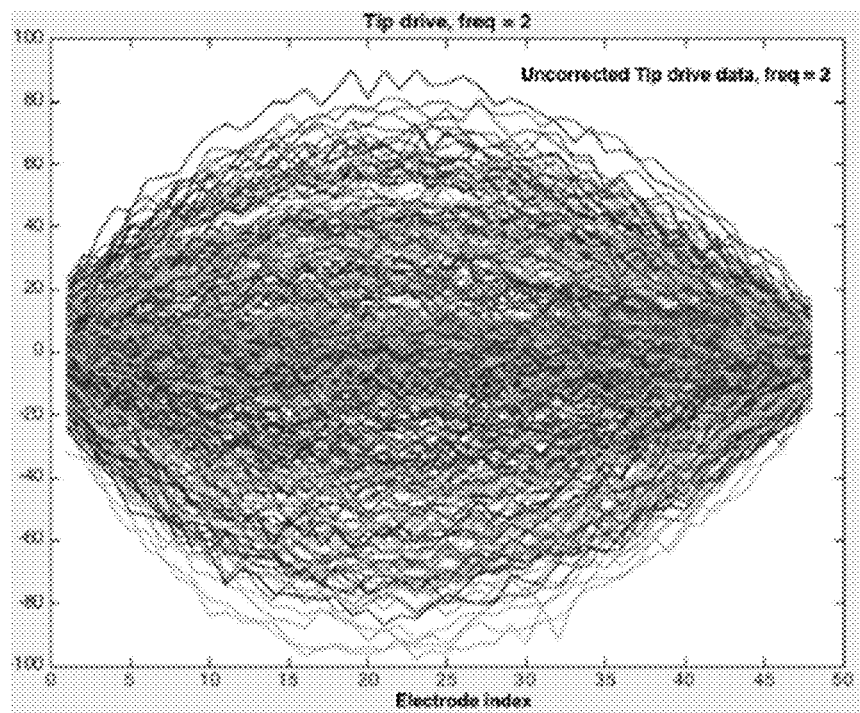
FIG. 4A shows an example of a characteristic coupled LCD noise on a stylus drive line according to some embodiments of the present disclosure.
Figure 4B:
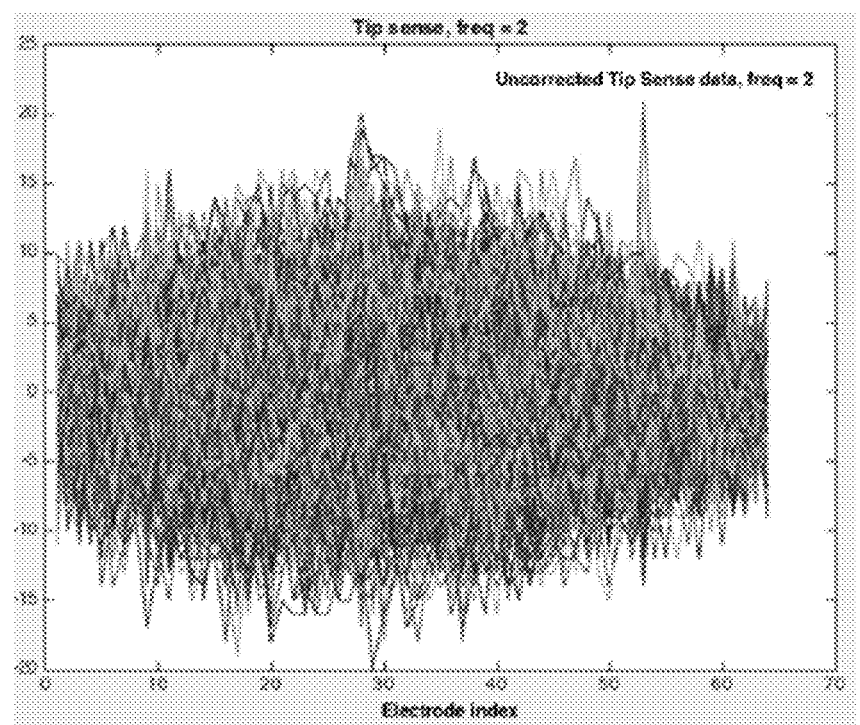
FIG. 4B shows an example of a characteristic coupled LCD noise on a stylus sense line according to some embodiments of the present disclosure.

FIG. 4 shows an example of a characteristic coupled LCD noise according to some embodiments of the present disclosure. The noise shown in FIG. 4A represents typical noise experienced on a stylus drive line and in FIG. 4B typical noise experienced on a sense line of, e.g., an APPLE IPAD PRO device. (The stylus drive lines are termed drive lines, as they serve as drive electrodes for touch detection, but serve as sense electrodes for stylus detection.) This noise includes noise coupled from LCD circuitry, which creates errors in the sensed position of an active stylus, as described below with respect to FIG. 5. Because noise of this type injects a random error into the sensed row and column positions of a stylus, the precision with which the stylus's position can be determined is reduced.

Figure 5:
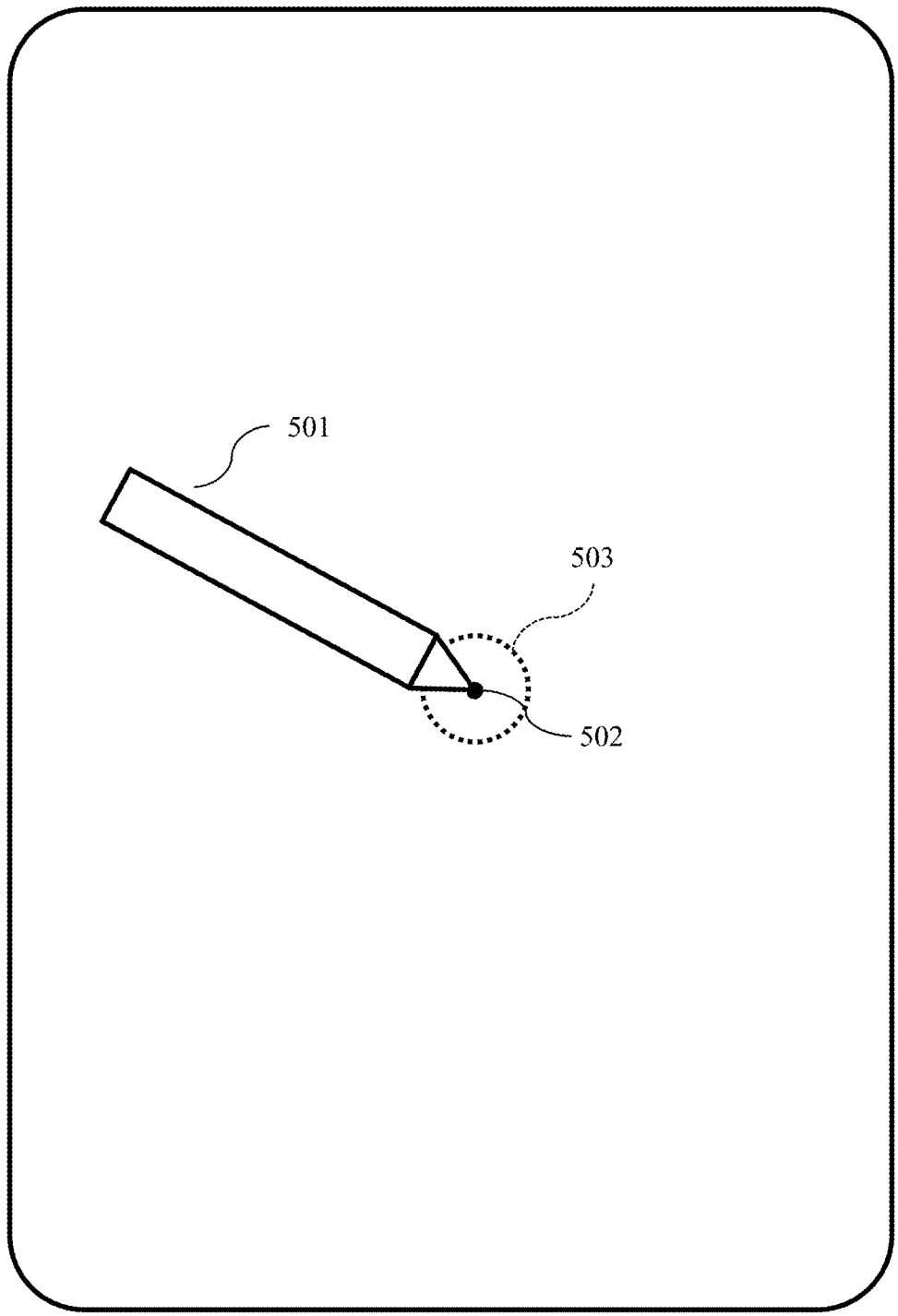
FIG. 5 shows an example of reduced accuracy of detected position of a stylus due to coupled LCD noise according to some embodiments of the present disclosure.

FIG. 5 shows an example of reduced accuracy of detected position of a stylus due to coupled LCD noise according to some embodiments of the present disclosure. As shown in FIG. 5, the actual position of the stylus 501 is point 502. However, the detected position may be anywhere within error circle 503 due to the noise induced by the LCD.

Figure 6:
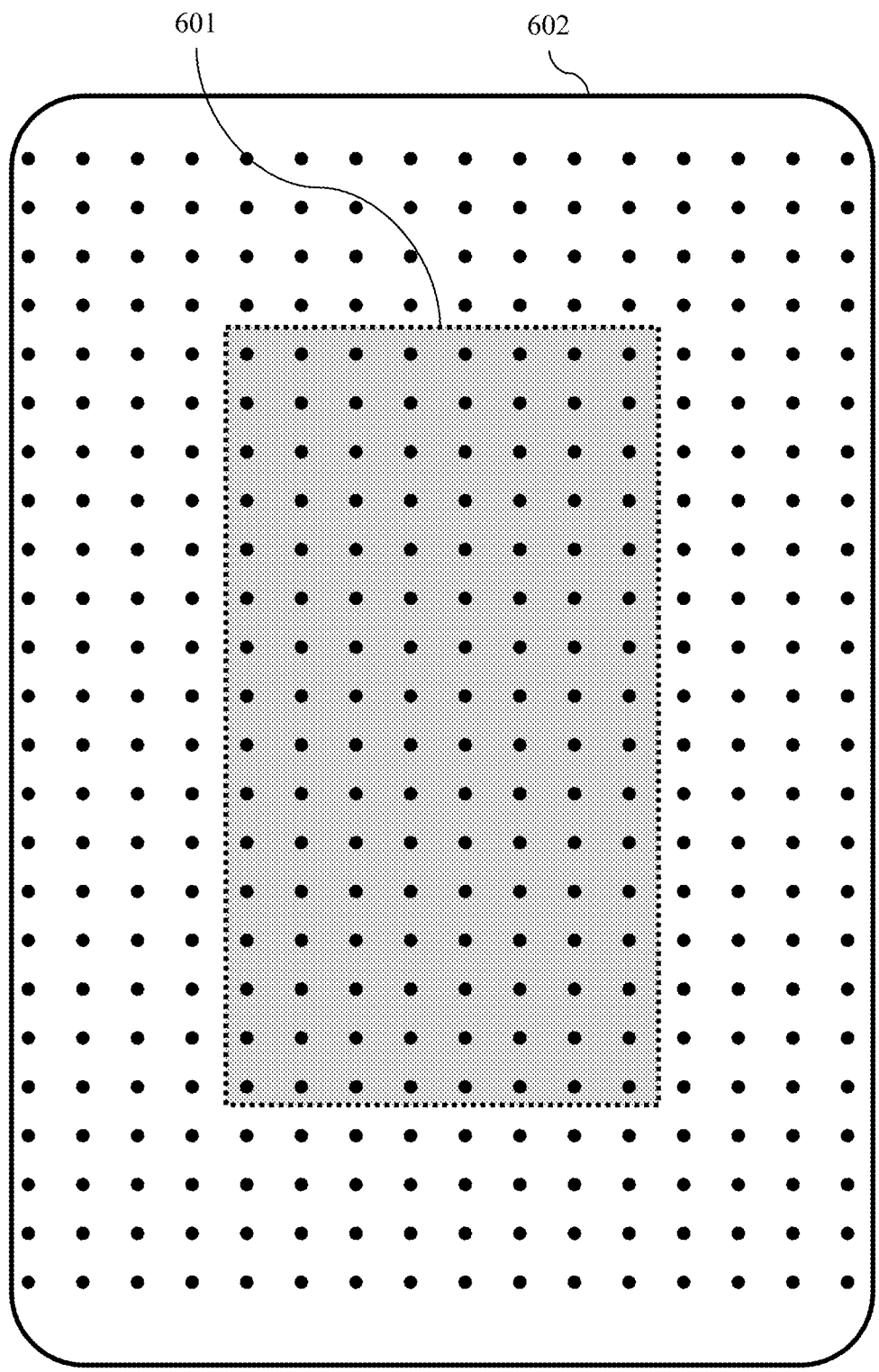
FIG. 6 shows an electrode grid and illustrates core and non-core electrodes according to some embodiments of the present disclosure.

FIG. 6 shows an electrode grid and illustrates core and non-core electrodes according to some embodiments of the present disclosure. A core electrode is any electrode which has at least K electrodes in each direction from the electrode towards an edge of the device, where K is determined based on a minimum electrode offset $D_{off}$ and a desired number of electrodes to measure for noise reduction N, such that $K=D_{off}+N$. A non-core electrode is an electrode which is not a core electrode, i.e., an electrode in a location closer towards an edge of the device such that there will not be enough electrodes in that direction to move K electrodes. Electrodes (not labeled but shown as points on the figure) are present at the intersection of the row and column sense lines (not shown). Shaded area 601, in the center, represents the group of electrodes that may be considered core electrodes for an embodiment of the present disclosure in which the minimum offset $D_{off}$ (i.e., the number of electrodes to skip before incorporating electrodes into a mitigation calculation) is 2 and the number of electrodes N to be incorporated into the mitigation calculation is 2, while the remaining electrodes in area 602 represent the group of electrodes that are non-core electrodes.

Figure 7A:
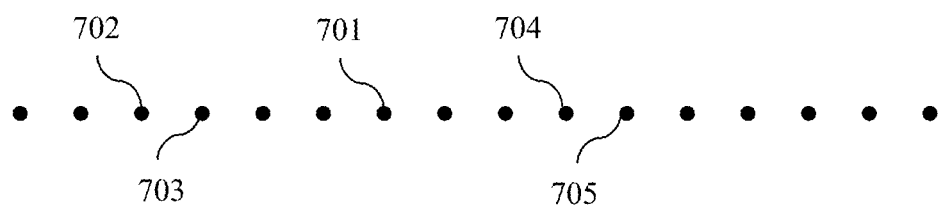
FIG. 7A shows an electrode grid and illustrates electrodes suitable for noise mitigation for a core electrode according to some embodiments of the present disclosure.
Figure 7B:
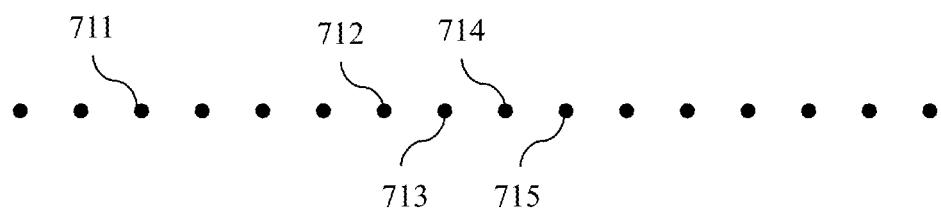
FIG. 7B shows an electrode grid and illustrates electrodes suitable for a non-core electrode according to some embodiments of the present disclosure.

FIGS. 7A and 7B shows a line of electrodes within an electrode grid (not shown) and illustrates electrodes suitable for noise mitigation for a core electrode and for a non-core electrode according to some embodiments of the present disclosure.

In FIG. 7A, core electrode 701 is an electrode which is the subject of noise mitigation performed according to an embodiment of the present disclosure. In the illustrated embodiment, $D_{off}$ is 2 and N is 2. In this embodiment, because N=2, two electrodes on each side will be used for noise mitigation measurements, and because $D_{off}=2$, the two electrodes closest to the subject electrode are not used. Thus, electrodes 702, 703, 704, and 705 are electrodes suitable for use in noise mitigation.

In FIG. 7B, non-core electrode 711 is an electrode which is the subject of noise mitigation performed according to an embodiment of the present disclosure in which $D_{off}$ is 3 and N is 2, and thus for an embodiment in which M is twice N, M is 4. Electrodes 712, 713, 714, and 715 are electrodes suitable for use in noise mitigation. Because $D_{off}$ in this embodiment is 3, the 3 electrodes in the direction away from the edge are not used, and then the next M electrodes are used (in this case, the next 4 electrodes).

As shown in FIGS. 7A and 7B, in some embodiments of the present disclosure mitigation may be performed only across a row line. In other embodiments, mitigation may be performed across a column line or across both row and column lines. In some embodiments, mitigation may be performed across a two-dimensional shape, such as on the electrodes lying within an annulus of inner radius $D_{off}$ and outer radius $D_{off}+N$.

Figure 8:
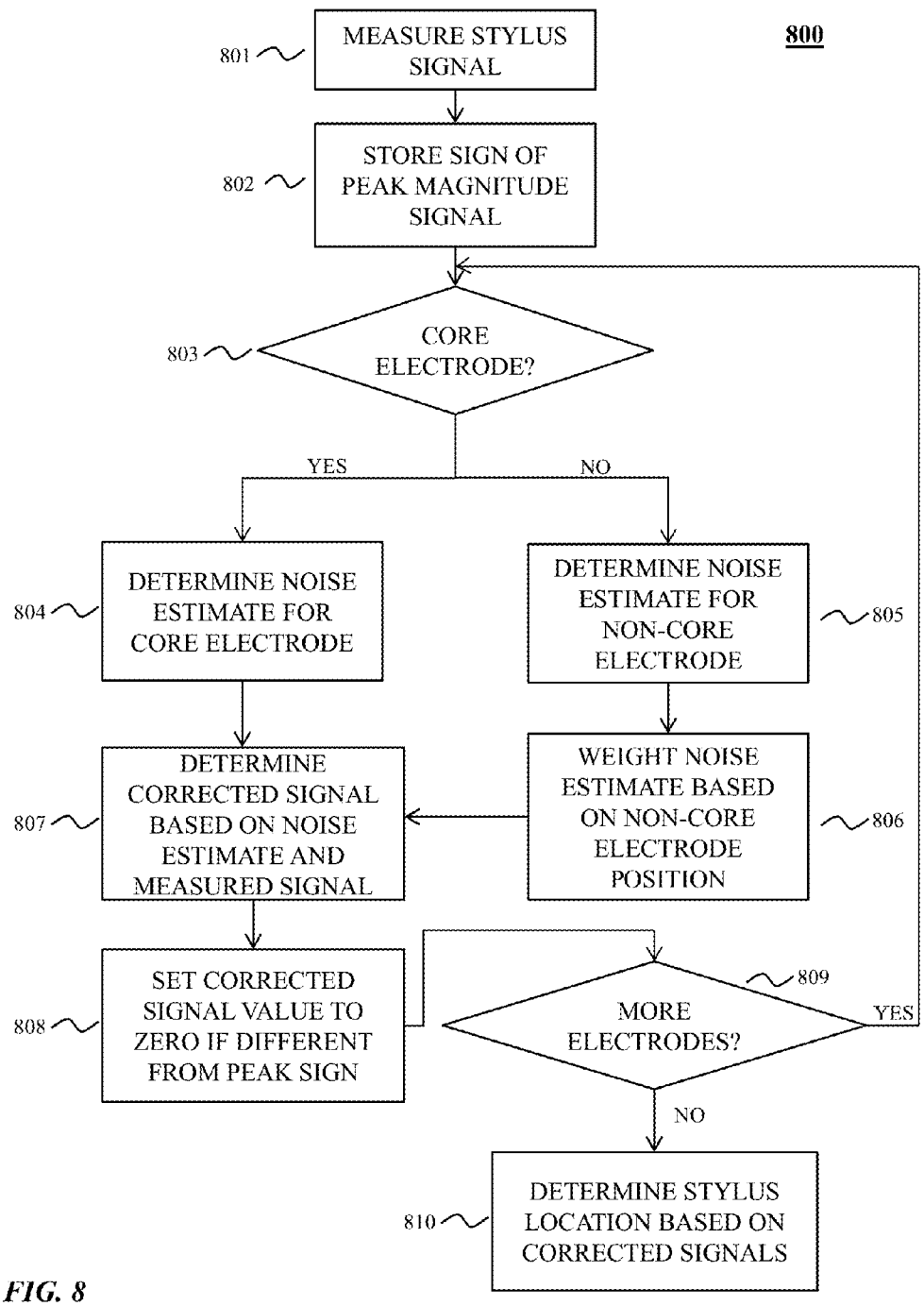
FIG. 8 shows a method of noise mitigation according to some embodiments of the present disclosure.

FIG. 8 shows a method 800 of noise mitigation according to some embodiments of the present disclosure. In step 801, the stylus signal is measured at each electrode. In some embodiments of the present disclosure, the signal is then separated into an I (in-phase) signal and a Q (quadrature) signal, and the method is performed on each signal separately starting from step 802.

In step 802, the sign of the peak magnitude signal across all electrodes on a given sense line (e.g., a row line or a column line) is stored. For example, if the I signal is being processed, then the I signal is determined for each electrode on the line, and the electrode with the I signal of the greatest magnitude (positive or negative) is determined. If the I signal with the greatest magnitude is positive, then a positive sign is stored, and if the I signal with the greatest magnitude is negative, then a negative sign is stored. Because the stylus is an active stylus, the electrode with the greatest magnitude is likely being driven actively at the time of measurement, so the measured sign represents the sign of the current stylus signal. In addition, an electrode index I is set to zero.

In step 803, it is determined whether the current electrode (the electrode with the index number I) is a core electrode. A core electrode is any electrode which has at least K electrodes in each direction from it on the line. K is determined based on a minimum electrode offset $D_{off}$ and a desired number of electrodes to measure for noise reduction N, such that $K=D_{off}+N$. K is equal to Doff+N because the noise mitigation algorithm used will not be able to select all needed electrodes if the electrode to be mitigated is not at least K electrodes from the edge. If the current electrode is a core electrode, the method proceeds to step 804. If the current electrode is not a core electrode, the method proceeds to step 805.

In step 804, an estimated noise is determined for a core electrode. To determine the estimated noise, the values at the N closest electrodes that are at least $D_{off}$ electrodes away to each side of the current electrode are averaged. For example, if $D_{off}$ is 2 and N is 2, the nearest two electrodes on each side are ignored and the next 2 electrodes in each direction are measured and averaged, as shown in FIG. 7A. This calculation may be represented as shown in Equation 1 below:

$$\text{Noise}_{est} = \frac{\sum_{x=1}^{x=N} V(I + D_{off} + x) + V(I - D_{off} - x)}{2*N} \quad \text{(Eq. 1)}$$

In Equation 1, V(y) is the measured signal at the electrode with index y.

In step 805, an estimated noise is determined for a non-core electrode. To determine the estimated noise, the values at the 2*N electrodes that are at least $D_{off}$ electrodes away to the side of the non-core electrode that has more electrodes on it (the side towards the center of the display) are averaged. For example, if $D_{off}$ is 3 and N is 2, and M is twice N and thus M is 4, the nearest three electrodes on each side are ignored and the next four electrodes are measured and averaged. This selection is shown visually in FIG. 7B. This calculation may be represented as shown in Equation 2 below for electrodes which are on the edge closer to the electrode of index 0:

$$\text{Noise}_{est} = \frac{\sum_{x=1}^{x=2*N} V(I + D_{off} + x)}{2*N} \quad \text{(Eq. 2)}$$

For electrodes which are on the edge closer to the electrode of the highest index, the calculation may instead be represented as shown in Equation 3 below:

$$\text{Noise}_{est} = \frac{\sum_{x=1}^{x=2*N} V(I - D_{off} - x)}{2*N} \quad \text{(Eq. 3)}$$

In step 806, for a non-core electrode, the estimated noise may be weighted to account for a characteristic noise shape. For example, in some embodiments of the present disclosure in which the characteristic noise shape is bow-shaped with respect to electrode position, as shown in FIG. 3, weighting may be applied to reduce the estimated noise amount as the electrode comes closer to the edge of the display. In some embodiments, this may be performed according to Equation 4 below:

$$\text{Noise}_{weighted} = \text{Noise}_{est} * (\text{weight}_{default} + D_{edge}/E) \quad \text{(Eq. 4)}$$

In this equation, weight$_{default}$ is a default weighting coefficient, $D_{edge}$ is the distance from the edge of the display (for example, measured in number of electrodes away from the zero or maximum indexed electrode), and E is the total number of electrodes on the line for which mitigation is being performed.

In step 807, for both core and non-core electrodes, a corrected signal value is determined by subtracting the estimated noise (after weighting, for non-core electrodes) from the measured signal value at the electrode.

In step 808, the sign of the corrected signal value is compared to the stored sign of the peak magnitude signal. If the signs are the same, the corrected value is used as-is. If the signs are not the same, then the corrected signal value cannot be stylus signal, because it is not in phase with the stylus signal. As a result, it is noise and can be ignored by setting the corrected value to 0.

In step 809, it is checked whether all electrodes have been processed. For example, in some embodiments of the present disclosure, it is determined if all electrodes on a sense row line have been processed. In other embodiments of the present disclosure, it is determined if all electrodes on a sense column line have had their I or Q signal processed. If electrodes remain to be processed, the electrode index is incremented and the method returns to step 803. In embodiments of the present disclosure which process the I and Q signals separately, if either of the I signals or the Q signals remain to be processed, then the method restarts at step 802 with processing of the I or Q signal.

In step 810, after all electrodes and signals have been processed, a stylus location is determined based on the corrected value signals in a manner known in the art, except that the corrected value signals are used in place of the measured signals.

FIG. 9 shows an example of sensed coupled LCD noise after noise mitigation according to some embodiments of the present disclosure next to the noise previously shown in FIG. 4. The noise shown in FIG. 9 represents typical noise experienced on a stylus drive line and on a sense line of, e.g., an APPLE IPAD PRO device, after noise mitigation according to the method shown in FIG. 8. This noise is noise coupled from the LCD circuitry.

Figure 9A:
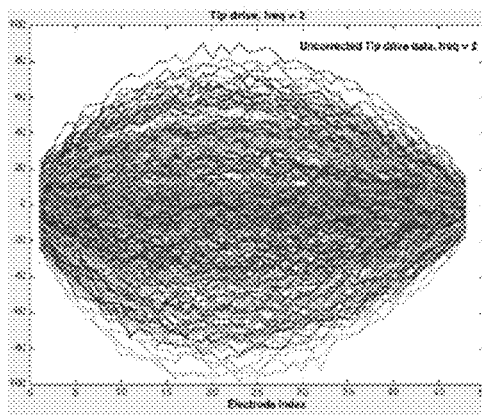
FIG. 9A shows an example of noise measured on a stylus drive line.
Figure 9B:
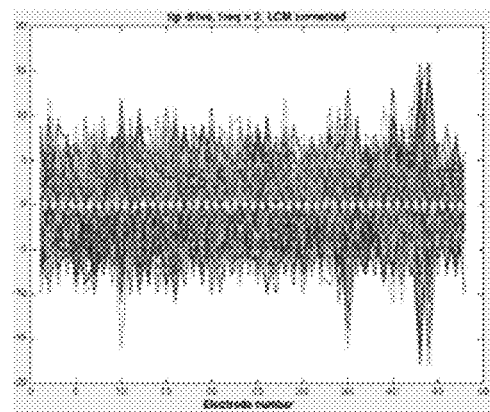
FIG. 9B shows an example of noise measured on a stylus drive line after noise mitigation according to some embodiments of the present disclosure.

In FIG. 9A, the image shows the noise measured on a drive line prior to application of a noise mitigation technique according to embodiments of the present disclosure. The image in FIG. 9B is the noise measured on the drive line after application of the noise mitigation technique. Similarly, in FIG. 9C, the image shows the noise measured on a sense line prior to application of a noise mitigation technique according to embodiments of the present disclosure. The image in FIG. 9D shows the noise measured on the sense line after application of the noise mitigation technique.

Figure 9C:
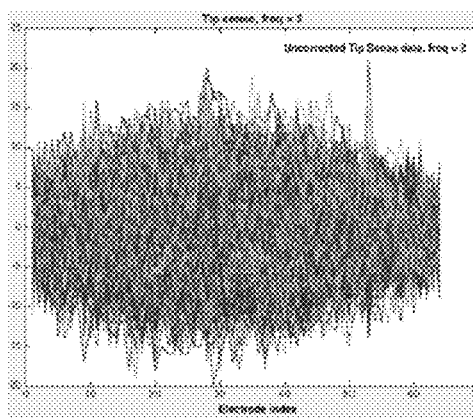
FIG. 9C shows an example of noise measured on a stylus sense line.
Figure 9D:
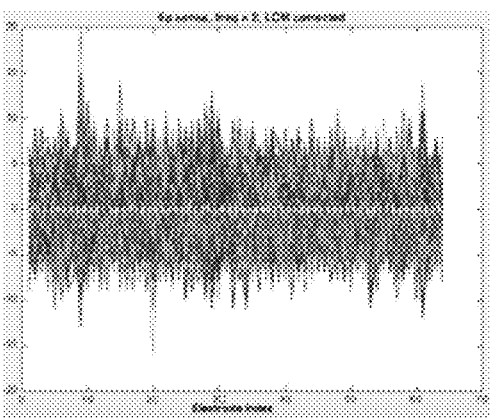
FIG. 9D shows an example of noise measured on a stylus sense line after noise mitigation according to some embodiments of the present disclosure.

In both FIG. 9A as compared to FIG. 9B and FIG. 9C as compared to FIG. 9D, it can be seen that, after mitigation, the noise on the stylus drive line has approximately $\frac{1}{8}^{th}$ the peak magnitude and is approximately constant with respect to position across the electrodes, while noise on the sense line has approximately ½ the peak magnitude and is approximately constant with respect to position across the electrodes.

Figure 10:
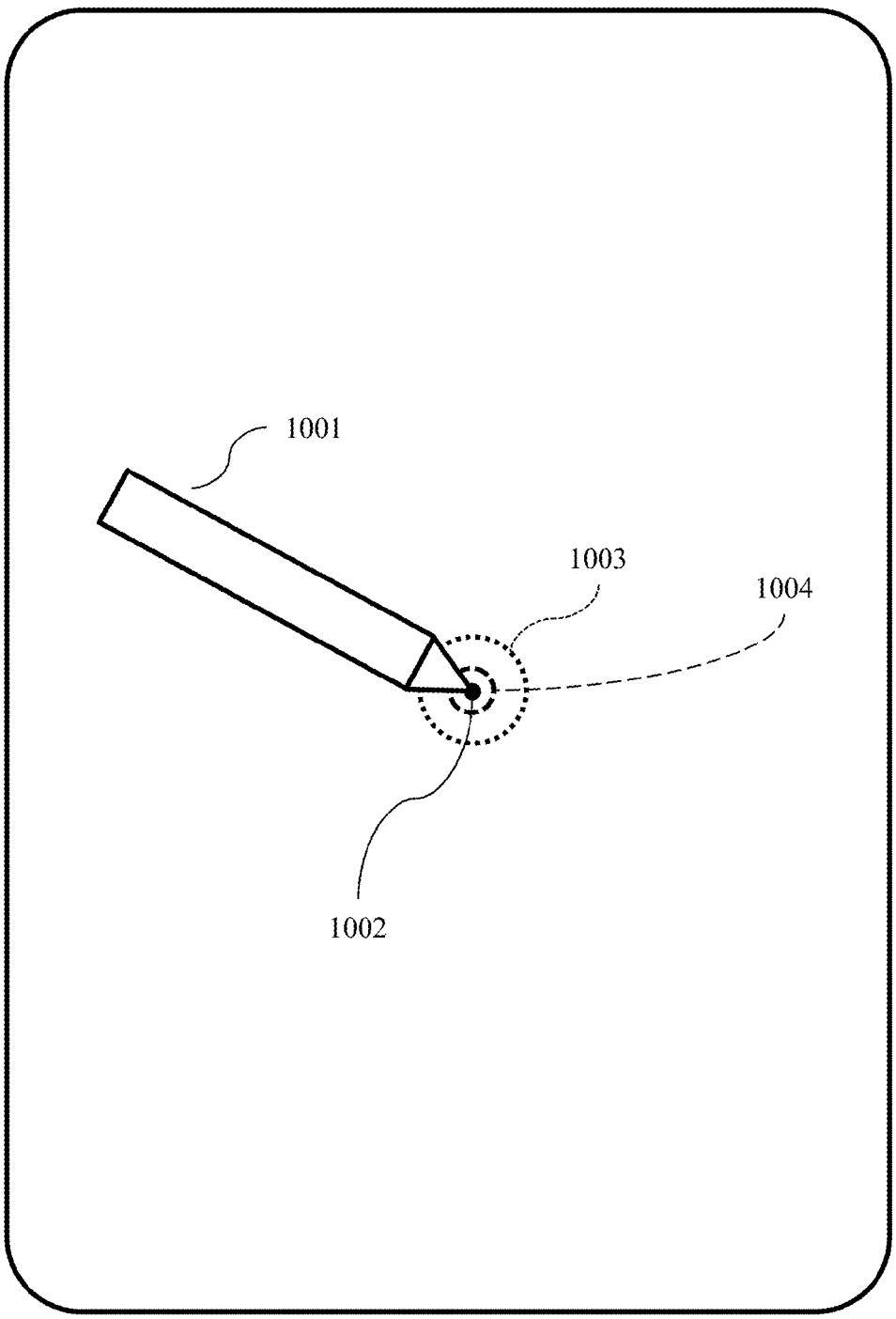
FIG. 10 shows an example of improved accuracy of detected position of a stylus due to mitigation of coupled LCD noise according to some embodiments of the present disclosure.

FIG. 10 shows an example of improved accuracy of detected position of a stylus due to mitigation of coupled LCD noise according to some embodiments of the present disclosure. As shown in FIG. 10, the actual position of the stylus 1001 is point 1002. If a noise mitigation method according to some embodiments of the present disclosure has not been performed, then the stylus may be detected within the circle 1003. However, if the noise mitigation method according to some embodiments of the present disclosure has been performed, resulting in a reduction in noise (as, for example, shown in FIG. 9), the area in which the stylus may be detected is the circle 1004. As can be seen, circle 1004 is smaller than circle 1003, and thus stylus position detection accuracy is significantly improved over a system without a noise mitigation method as described in some embodiments of the present disclosure.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method for mitigating LCD circuitry noise in a stylus touch device, comprising:
    storing a sign of a peak magnitude signal of a plurality of signals measured at a plurality of electrodes;
    determining a set of core electrodes of the plurality of electrodes and a set of non-core electrodes of the plurality of electrodes;
    for each core electrode of the plurality of electrodes, determining a noise estimate for the core electrode based on a corresponding core electrode mitigation set determined by a position of the core electrode;
    for each non-core electrode of the plurality of electrodes, determining a noise estimate based on a corresponding non-core electrode mitigation set determined by a position of the non-core electrode;
    determining a plurality of corrected signals, wherein for each core electrode and each non-core electrode a corresponding corrected signal of the plurality of corrected signals is determined based on the noise estimate and the signal measured at the electrode;

for each of the plurality of corrected signals, setting the corrected signal to zero if the sign of the corrected signal is not the same as the stored peak magnitude signal sign; and determining a position of an active stylus based on the plurality of corrected signals.

2. The method of claim 1, wherein each corrected signal is determined by subtracting the noise estimate for an electrode from the signal measured at the corresponding electrode.

3. The method of claim 1, further comprising weighting the noise estimate for each non-core electrode based on a default weight, the position of the corresponding non-core electrode with respect to an edge of the device, and a total number of electrodes being processed.

4. The method of claim 3, wherein the noise estimate is reduced in weight as the corresponding non-core electrode position is closer to the edge of the device.

5. The method of claim 1, wherein the core electrode mitigation set comprises electrodes at least a pre-determined offset number of electrodes away from the corresponding core electrode.

6. The method of claim 1, wherein the core electrode mitigation set comprises electrodes at least a pre-determined offset number of electrodes away from the corresponding core electrode and wherein the core electrode mitigation set comprises a first pre-determined number of electrodes in each direction from the core electrode.

7. The method of claim 1, wherein the non-core electrode mitigation set comprises electrodes at least a pre-determined offset number of electrodes away from the corresponding non-core electrode in a direction of a center of the device.

8. The method of claim 7, wherein:
the core electrode mitigation set comprises electrodes at least a pre-determined offset number of electrodes away from the corresponding core electrode,
the core electrode mitigation set comprises a first pre-determined number of electrodes in each direction from the corresponding core electrode,
and the non-core electrode mitigation set comprises a second pre-determined number of electrodes in the direction of the center of the device that is twice the first pre-determined number of electrodes.

9. The method of claim 1, wherein the plurality of measured signals are split into a plurality of I domain signals and a plurality of Q domain signals and wherein the plurality of I domain signals and the plurality of Q domain signals are processed independently.

10. The method of claim 1, wherein processing is performed on one of a row sense line or a column sense line.

11. The method of claim 1, wherein processing is performed on a two-dimensional grid of signals.

12. An active stylus LCD device comprising:
a display;
a plurality of electrodes which experience noise induced by one or more electrical components of the display;
a memory storing program instructions; and
a processor coupled to the memory and configured to execute the program instructions to:
store a sign of a peak magnitude signal of a plurality of signals measured at the plurality of electrodes;
determine a set of core electrodes of the plurality of electrodes and a set of non-core electrodes of the plurality of electrodes;
for each core electrode of the plurality of electrodes, determine a noise estimate for the core electrode based on a corresponding core electrode mitigation set determined by a position of the core electrode;
for each non-core electrode of the plurality of electrodes, determine a noise estimate based on a corresponding non-core electrode mitigation set determined by a position of the non-core electrode;
determine a plurality of corrected signals, wherein for each core electrode and each non-core electrode a corresponding corrected signal of the plurality of corrected signals is determined based on the noise estimate and the signal measured at the electrode;
for each of the plurality of corrected signals, set the corrected signal to zero if the sign of the corrected signal is not the same as the stored peak magnitude signal sign; and
determine a position of an active stylus based on the plurality of corrected signals.

13. The device of claim 12, wherein each corrected signal is determined by subtracting the noise estimate for an electrode from the signal measured at the corresponding electrode.

14. The device of claim 12, wherein the processor executes further program instructions to weight the noise estimate for each non-core electrode based on a default weight, the position of the corresponding non-core electrode with respect to an edge of the device, and a total number of electrodes being processed.

15. The device of claim 12, wherein the noise estimate is reduced in weight as the corresponding non-core electrode position is closer to the edge of the device.

16. The device of claim 12, wherein the core electrode mitigation set comprises electrodes at least a pre-determined offset number of electrodes away from the corresponding core electrode.

17. The device of claim 12, wherein the core electrode mitigation set comprises electrodes at least a pre-determined offset number of electrodes away from the corresponding core electrode and wherein the core electrode mitigation set comprises a first pre-determined number of electrodes in each direction from the core electrode.

18. The device of claim 12, wherein the non-core electrode mitigation set comprises electrodes at least a pre-determined offset number of electrodes away from the corresponding non-core electrode in a direction of a center of the device.

19. The device of claim 18, wherein:
the core electrode mitigation set comprises electrodes at least a pre-determined offset number of electrodes away from the corresponding core electrode,
the core electrode mitigation set comprises a first pre-determined number of electrodes in each direction from the corresponding core electrode,
and the non-core electrode mitigation set comprises a second pre-determined number of electrodes in the direction of the center of the device that is twice the first pre-determined number of electrodes.

20. The device of claim 12, wherein the plurality of measured signals are split into a plurality of I domain signals and a plurality of Q domain signals and wherein the plurality of I domain signals and the plurality of Q domain signals are processed independently.

* * * * *